US012669194B2

(12) United States Patent
Gruner et al.

(10) Patent No.: US 12,669,194 B2
(45) Date of Patent: Jun. 30, 2026

(54) PRESSURE RELIEF DEVICE HAVING CONDUCTIVE TRACE SENSOR FORMED THEREON

(71) Applicant: Fike Corporation, Blue Springs, MO (US)

(72) Inventors: Jason Gruner, Lees Summit, MO (US); Dean Miller, Lees Summit, MO (US); Ross Edgar, Overland Park, KS (US); Travis Johnson, Independence, MO (US)

(73) Assignee: Fike Corporation, Blue Springs, MO (US)

( * ) Notice: Subject to any disclaimer, the term of this patent is extended or adjusted under 35 U.S.C. 154(b) by 3 days.

(21) Appl. No.: 18/937,590

(22) Filed: Nov. 5, 2024

(65) Prior Publication Data

US 2025/0164031 A1     May 22, 2025

Related U.S. Application Data

(60) Provisional application No. 63/597,805, filed on Nov. 10, 2023.

(51) Int. Cl.
*F16K 37/00*     (2006.01)
*F16K 17/40*     (2006.01)
(52) U.S. Cl.
CPC ........ *F16K 37/0041* (2013.01); *F16K 17/403* (2013.01)
(58) Field of Classification Search
CPC ... F16K 37/0041; F16K 17/403; F16K 17/162
See application file for complete search history.

(56) References Cited

U.S. PATENT DOCUMENTS 3,704,807 A * 12/1972 Lidgard ................ F16K 17/162
                                                           220/89.2
3,777,772 A * 12/1973 Arnold .................. B60R 21/268
                                                           137/68.13
(Continued)

FOREIGN PATENT DOCUMENTS

DE      202018101828 U1    7/2019
JP          62177382 A     8/1987
(Continued)

OTHER PUBLICATIONS

International Search Report mailed Feb. 24, 2025, in corresponding PCT/US2024/054855, 24 pages.

*Primary Examiner* — Umashankar Venkatesan
(74) *Attorney, Agent, or Firm* — Hovey Williams LLP

(57)     ABSTRACT

An over-pressure relief device includes a pressure relief member and a rupture indicator. The pressure relief member includes a central rupturable section and an outer flange section in surrounding relationship to the central section. The rupture indicator includes an electrically nonconductive substrate and an electrically conductive trace. The substrate is operatively associated with the outer flange section and includes a cantilevered tab that extends over and in spaced relation to a surface of the central section. The trace is located on the substrate and extends onto a portion of the tab. The trace defines an electrical circuit capable of conducting an electrical signal and operable to detect a process condition associated with the over-pressure relief device.

31 Claims, 19 Drawing Sheets

(56)                 References Cited

U.S. PATENT DOCUMENTS

| 3,834,729 A * | 9/1974 | Oka ..................... B60R 21/268 |
| | | 222/3 |
| 4,342,988 A | 8/1982 | Thompson et al. |
| 4,905,722 A * | 3/1990 | Rooker ............... B23Q 16/026 |
| | | 137/68.24 |
| 4,978,947 A * | 12/1990 | Finnegan ............... F16K 37/00 |
| | | 137/68.27 |
| 5,155,471 A | 10/1992 | Ellis et al. |
| 5,279,321 A | 1/1994 | Krimm |
| 5,313,194 A | 5/1994 | Varos |
| 5,583,490 A | 12/1996 | Santos et al. |
| 5,631,634 A * | 5/1997 | Strelow ..................... G01F 1/40 |
| | | 340/610 |
| 5,657,001 A | 8/1997 | Wilson |
| 5,661,277 A | 8/1997 | Graham, II |
| 5,934,308 A | 8/1999 | Farwell |

| 6,241,113 B1 | 6/2001 | Mozley et al. |
| 6,318,576 B1 | 11/2001 | Graham et al. |
| 6,321,771 B1 * | 11/2001 | Brazier ................. F16K 37/005 |
| | | 137/68.24 |
| 11,548,079 B2 * | 1/2023 | Krebill ..................... B23C 3/34 |
| 2005/0160786 A1 | 7/2005 | Brazier et al. |
| 2005/0284649 A1 | 12/2005 | Sabates et al. |
| 2008/0289945 A1 | 11/2008 | Brazier et al. |
| 2010/0006547 A1 | 1/2010 | Shaw et al. |
| 2011/0303523 A1 * | 12/2011 | Walker ............... F16K 37/0041 |
| | | 137/68.19 |
| 2016/0334029 A1 * | 11/2016 | French ............... F16K 31/1262 |

FOREIGN PATENT DOCUMENTS

| JP | 0625677 U | 4/1994 |
| KR | 200460111 Y1 | 5/2012 |
| WO | 2005054731 A1 | 6/2005 |

* cited by examiner

PRESSURE RELIEF DEVICE HAVING CONDUCTIVE TRACE SENSOR FORMED THEREON

CROSS-REFERENCE TO RELATED APPLICATION

This application claims the benefit of U.S. Provisional Patent Application No. 63/597,805, filed Nov. 10, 2023, which is incorporated by reference herein in its entirety.

BACKGROUND OF THE INVENTION

Field of the Invention

The present invention is generally directed toward a pressure relief device that includes circuitry for sensing operational conditions associated with the device. Particularly, the circuitry comprises an electrically conductive trace that is cantilevered over and in spaced relation to a central portion of the pressure relief device. The electrically conductive trace is positioned on a substrate operable to break and therefore at least partially affect the continuity of the trace.

Description of the Prior Art

Burst indicators are commonly used in conjunction with rupture disc monitoring systems so as to alert an operator when a disc ruptures so that the over-pressure condition causing the rupture can be investigated and the rupture disc replaced. Conventionally, burst indicators have comprised simple electrical circuits encased in a nonconductive material, such as Kapton film, and placed directly against a rupture disc, so that upon bursting of the disc, the circuit will be severed causing the monitoring system to alert an operator. U.S. Pat. No. 8,354,934 illustrates one such type of conventional burst indicator.

These traditional burst indicator designs have drawbacks that limit their use in certain systems. First, conventional designs require multiple installation steps when installing a burst indicator in conjunction with a rupture disc, requiring multiple installation technicians. For example, a plumber is required for installation of a rupture disc into a pipe system, while an electrician is necessary for installation of the burst indicator. Second, the conventional burst indicators are typically constructed as laminate structures with the aid of adhesives. Often, the adhesives are temperature sensitive and can begin to degrade upon exposure to mildly elevated temperature conditions. For example, certain conventional burst indicators comprise a circuit sandwiched between plies of Kapton films that are secured together with an adhesive. At temperatures of 200° F. or greater, the adhesives making up the burst indicator can break down resulting in delamination of the Kapton films and exposure of the conductive material making up the circuit. Additionally, when used in low-pressure systems, the energy transferred by the rupture disc petal may be insufficient to tear a burst indicator formed comprising a Kapton film and signal a ruptured disc.

Some traditional burst indicators comprise thin trace circuits that can be directly applied to a nonconductive film on the vent panel itself. When the vent panel is opened, the film would tear thereby severing the circuit within the burst indicator and triggering an alarm. However, such burst indicators have an operational temperature range in the region of 150-250° C. This is incompatible with explosion vents capable of withstanding high temperatures (400-600°

C.). Thus, there is a need for a one-piece burst indicator that can operate under extremely high temperatures.

SUMMARY OF THE INVENTION

In one embodiment according to the present invention, there is provided an over-pressure relief device including a pressure relief member and a rupture indicator. The pressure relief member includes a central rupturable section and an outer flange section in surrounding relationship to the central section. The rupture indicator includes an electrically nonconductive substrate and an electrically conductive trace. The substrate is operatively associated with the outer flange section and includes a cantilevered tab that extends from the substrate over and in spaced relation to a surface of the central section. The trace is located on the substrate and extends onto a portion of the tab. The trace defines an electrical circuit capable of conducting an electrical signal and operable to detect a process condition associated with the over-pressure relief device.

In another embodiment according to the present invention, there is provided a rupture indicator for detecting a process condition associated with an over-pressure relief device having a central rupturable section and an outer flange section in surrounding relationship to said central section. The rupture indicator includes an electrically nonconductive substrate and an electrically conductive trace. The electrically nonconductive substrate is configured to be operatively associated with the outer flange section and includes a cantilevered tab that is configured to extend from the substrate over and in spaced relation to a surface of the central section. The electrically conductive trace is located on the substrate and extends onto a portion of the tab. The trace defines an electrical circuit capable of conducting an electrical signal and operable to detect the process condition associated with the over-pressure relief device.

In another embodiment according to the present invention, there is provided a method of detecting opening of a pressure relief device. The method includes installing the pressure relief device within a structure to be protected from an overpressure condition. The pressure relief device includes a pressure relief member and a rupture indicator. The pressure relief member includes a central rupturable section and an outer flange section in surrounding relationship to the central section. The rupture indicator includes an electrically nonconductive substrate and an electrically conductive trace. The electrically nonconductive substrate is operatively associated with the outer flange section and includes a cantilevered tab that extends from the substrate over and in spaced relation to a surface of the central section. The electrically conductive trace is located on the substrate and extends onto a portion of the tab. The trace defines an electrical circuit capable of conducting an electrical signal and operable to detect the process condition associated with the over-pressure relief device. The method further includes detecting a severing of the circuit when an overpressure condition of a predetermined threshold causes the central section to rupture and form a petal that contacts and breaks the tab on the rupture indicator, thereby severing the circuit; and sounding an alarm.

In another embodiment according to the present invention, there is provided an over-pressure relief device including a pressure relief member and a rupture indicator. The pressure relief member includes a central rupturable section and an outer flange section in surrounding relationship to the central section. The rupture indicator includes a pliable substrate, an electrically conductive trace, and a rigid member. The substrate is operatively associated with the outer flange section and includes a cantilevered end that extends over and in spaced relation to a surface of the central section. The trace is located on the substrate and extends onto at least a portion of the cantilevered end and defines an electrical circuit capable of conducting an electrical signal. The rigid member is operatively associated with the substrate and extends over the trace on the portion of the cantilevered end so that when the central section ruptures forming a petal, the petal contacts and deforms the cantilevered end so that the rigid member contacts the trace, thereby affecting the circuit.

In another embodiment according to the present invention, there is provided a rupture indicator for detecting a process condition associated with an over-pressure relief device having a central rupturable section and an outer flange section in surrounding relationship to said central section. The rupture indicator includes a pliable substrate, an electrically conductive trace, and a rigid member. The substrate is configured to be operatively associated with the outer flange section and includes a cantilevered end that is configured to extend over in spaced relation to a surface of the central section. The trace is located on the substrate and extends onto at least a portion of the cantilevered end and defines an electrical circuit capable of conducting an electrical signal. The rigid member is operatively associated with the substrate and extends over the trace on the portion of the cantilevered end so that when the central section ruptures forming a petal, the petal contacts and deforms the cantilevered end so that the rigid member contacts the trace, thereby affecting the circuit.

In yet another embodiment according to the present invention, there is provided a method of detecting opening of a pressure relief device. The method includes installing the pressure relief device within a structure to be protected from an overpressure condition. The pressure relief device includes a pressure relief member and a rupture indicator. The pressure relief member includes a central rupturable section and an outer flange section in surrounding relationship to the central section. The rupture indicator includes a pliable substrate, an electrically conductive trace, and a rigid member. The substrate is operatively associated with the outer flange section and includes a cantilevered end that extends over and in spaced relation to a surface of the central section. The trace is located on the substrate and extends onto at least a portion of the cantilevered end and defines an electrical circuit capable of conducting an electrical signal. The rigid member is operatively associated with the substrate and extends over the trace on the portion of the cantilevered end. The method further includes detecting a severing of the circuit when an overpressure condition of a predetermined threshold causes the central section to rupture and form a petal that contacts and deforms the cantilevered end so that the rigid member contacts the trace, thereby severing the circuit; and sounding an alarm.

DETAILED DESCRIPTION OF THE PREFERRED EMBODIMENTS

Figure 1:
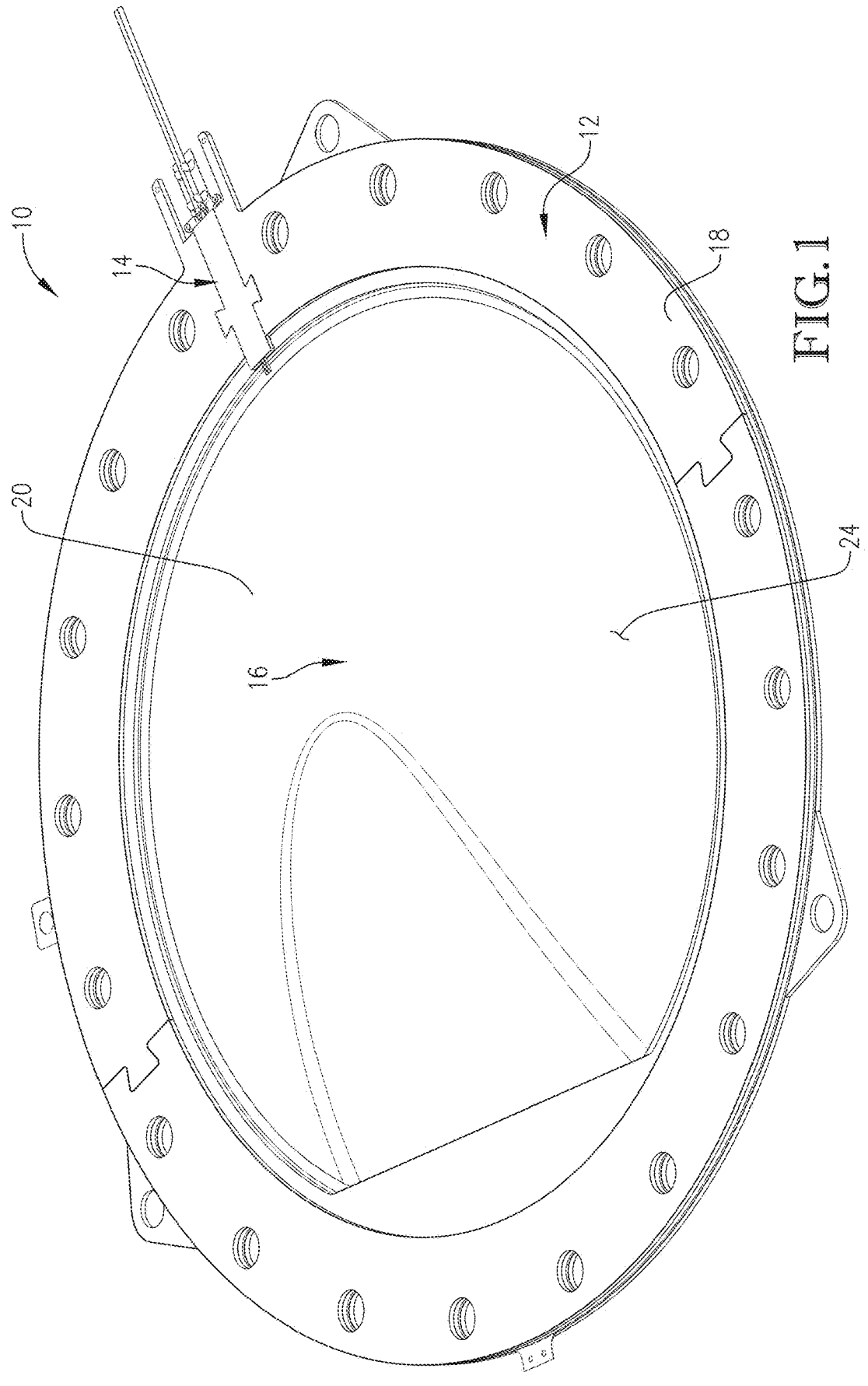
FIG. 1 is an elevated perspective view of a pressure relief device in accordance with one embodiment of the present invention.

In one embodiment of the present invention, there is provided an over-pressure relief device 10, as shown in FIG. 1. The device comprises circuitry that is operable to detect a condition associated with said over-pressure relief device, including, but are not limited to, a disc or vent panel rupture or an absence of a rupture. In certain embodiments, the condition associated with the over-pressure relief device can be detected by at least a partial a severing of the electrical circuit, such through a change in the resistance of the circuit, or a complete severing resulting in an open circuit. Any change in resistance (including an open circuit) can alter the electrical signal carried by the circuit, which can be detected by appropriate signal detection equipment.

Figure 2:
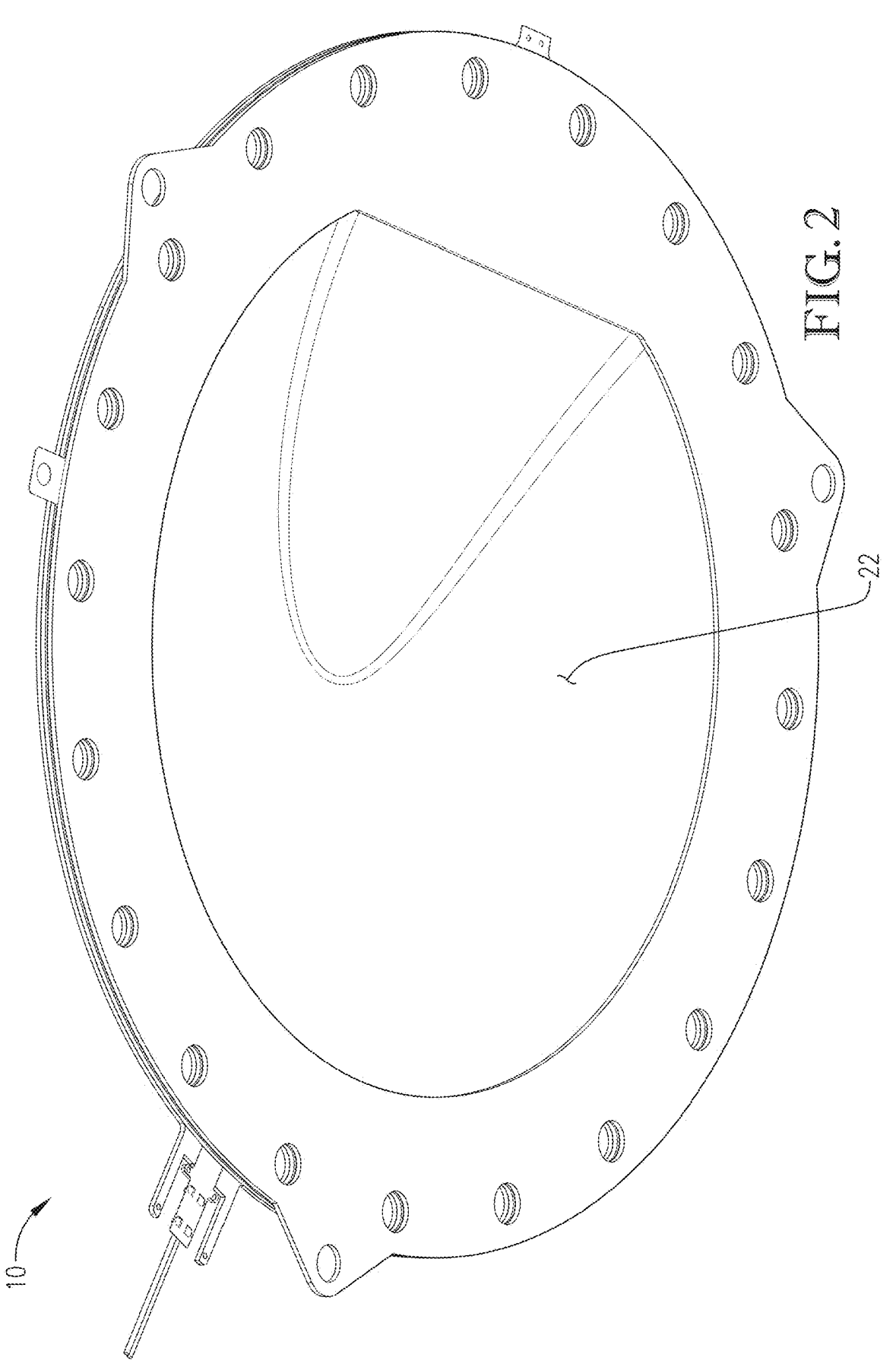
FIG. 2 is a is a lowered perspective view of the device of FIG. 1.

Turning to FIG. 1, the over-pressure relief device 10 comprises a pressure relief member 12 and a rupture indicator 14. The pressure relief member 12 includes a central rupturable section 16 and an outer flange section 18. In one or more embodiments, the pressure relief member 12 may be formed from any suitable metal or alloy that is appropriate for a particular application. In certain embodiments, over-pressure relief device 10 will be employed in high-temperature or highly corrosive applications. In those applications, member 12 may be formed of a heat-resistant alloy, such as stainless steel, INCONEL, or HASTALLOY. Member 12 is depicted as a forward-acting rupture disc wherein rupturable central section 16 comprises a bulged region 20. In such embodiments, the opposing faces of central section 16 comprise a concave face 22 (depicted in FIG. 2) and a convex face 24. However, it should be understood that other types of over-pressure relief devices may be employed without departing from the concepts of the present invention. For example, in certain embodiments, member 12 may be a bulged forward-acting rupture disc or a vent panel, a flat rupture disc or vent panel, or the like.

Figure 6:
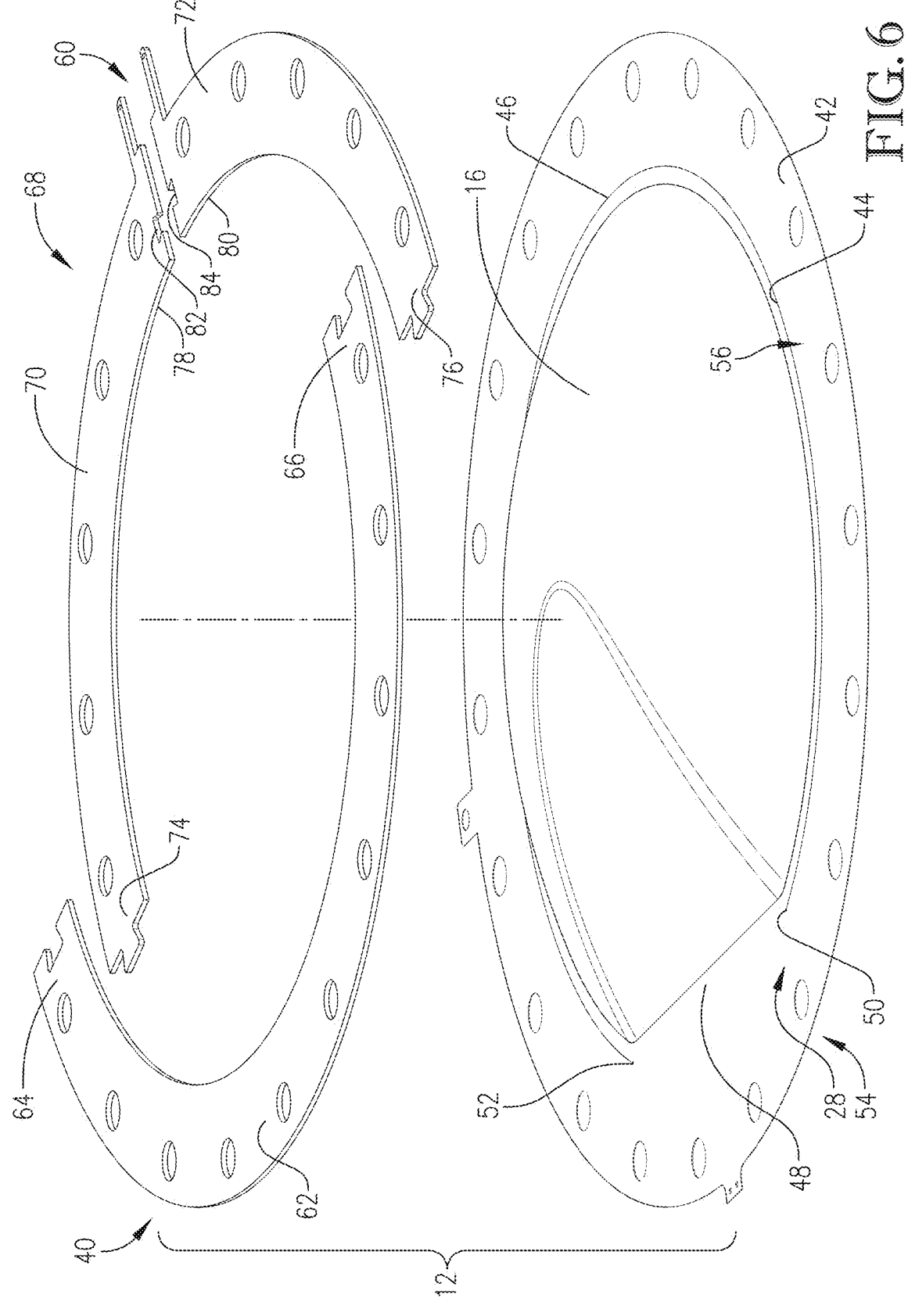
FIG. 6 is an exploded view of selected components of the pressure relief member of FIG. 3.

Turning to FIG. 6, in one or more embodiments, the member 12 includes a rupture disc 28 and a rupture indicator holder 40. The rupture disc 28 includes the central rupturable section 16 and a rupture disc flange 42 in a surrounding relationship with the central section 16. The rupture disc 28 comprises a line of opening 44 formed in the convex face 24 that defines a burst area of central rupturable section 16. Line of opening 44 comprises a line-of-opening recess having a depth that extends from face 24 toward face 22. The line of opening 44 may comprise nearly any desired configuration. However, in certain embodiments, line of opening 44 may be substantially C-shaped, resulting in formation of a single petal upon opening of member 12. Member 12 may optionally comprise a point of opening initiation 46 located along or proximal to the line of opening 44 and generally opposite of a hinge region 48 defined between ends 50, 52 of the line of opening 44. Line of opening 44 may be formed by any process known to those of skill in the art including die scoring, chemical electropolishing, mechanical milling, or laser machining. Preferably, the line of opening 44 is formed in central rupturable section 16 following at least a pre-bulging or final bulging operation.

The rupture indicator holder 40 is part of the flange section 18 and defines a slot 60 operable to receive the rupture indicator 14. The rupture indicator holder 40 includes a first section 62 with two mating ends 64, 66 that mate with a second section 68. The second section 68 includes two pieces 70, 72 that include complementary ends 74, 76 that mate with the mating ends 64, 66 of the first section 62. The two pieces 70, 72 of the second section 68 also include slot ends 78, 80 that define the slot 60 and include female mating structures 82, 84, such as sockets, recesses, indents, holes, or the like, for mating with and holding portions of the rupture indicator 14. The slot ends 78, 80 also include tabs 86, 88 (depicted in FIG. 3) projecting radially outward from the central rupturable section 16. The two pieces 70, 72 of the second section 68 enable quick replacement of the rupture indicator 14. Specifically, only fasteners used to secure the two pieces 70, 72 need be removed to replace the rupture indicator 14.

Figure 3:
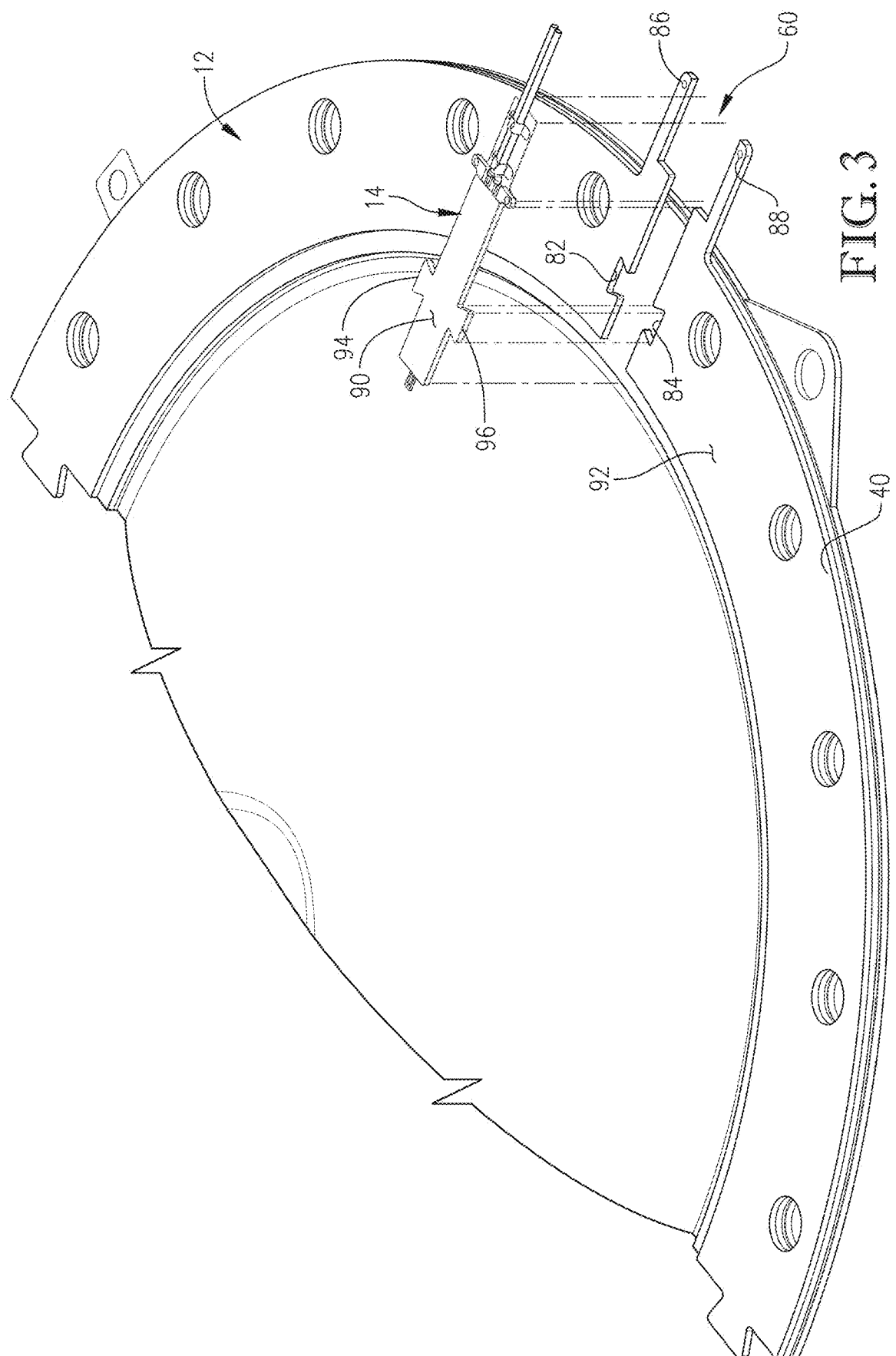
FIG. 3 is a close up, sectional view of the device of FIG. 1, illustrating the relative positioning of a rupture indicator and a pressure relief member.
Figure 7:
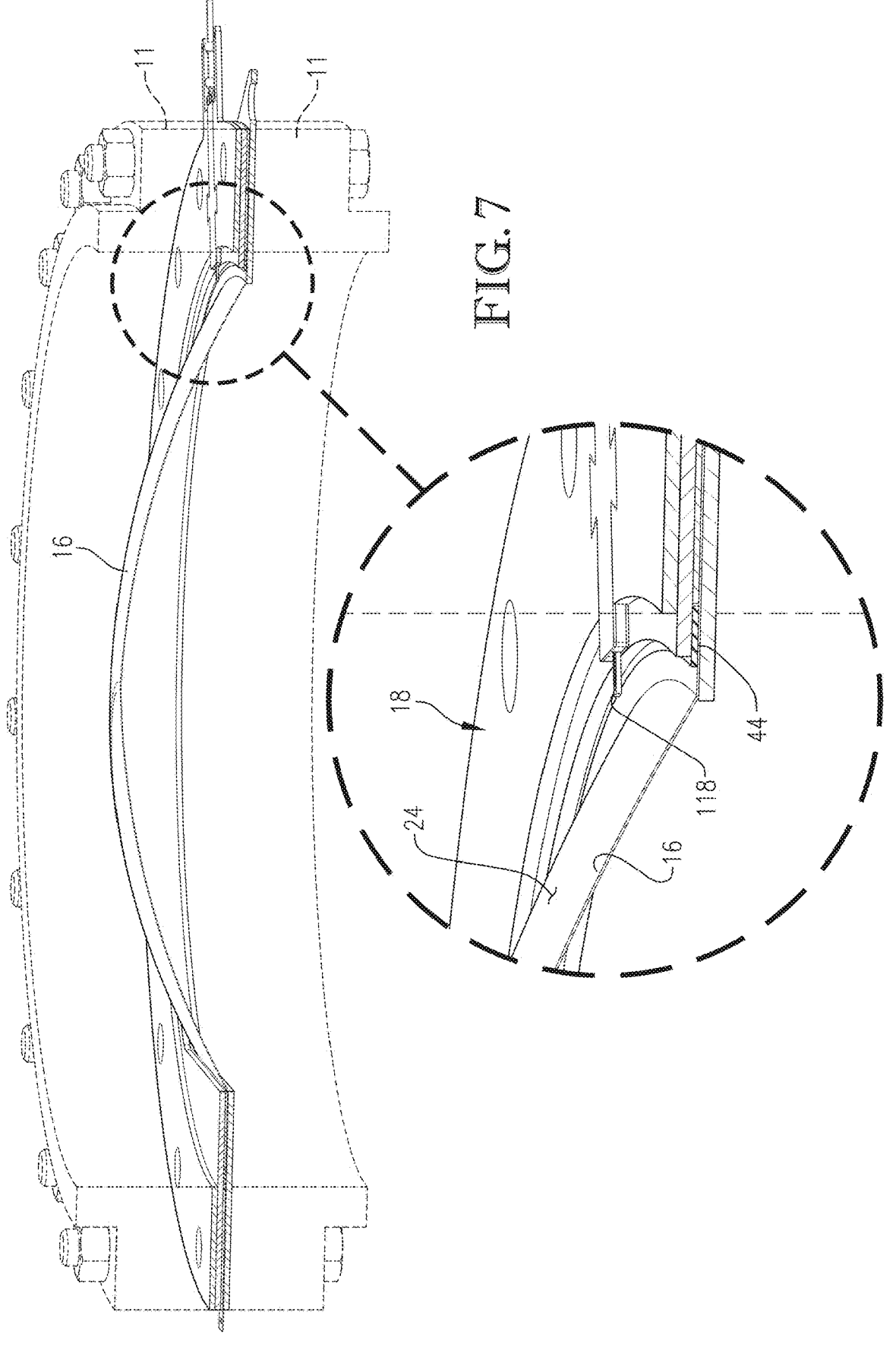
FIG. 7 is a close up, sectional view of the device of FIG. 1 operatively associated with pipe components, illustrating the device in a normal operating condition.

Turning to FIG. 3, the rupture indicator 14 is operable to be placed within the slot 60 of the member 12 so that the exterior top surface 90 of the rupture indicator 14 is flush with the top surface 92 of the rupture indicator holder 40 (as depicted in FIGS. 1 and 7). The rupture indicator 14 includes male mating structures 94, 96, such as tabs, knobs, keys, or the like, that are complementary to the mating structures 82, 84 of the holder 40. In one or more embodiments, the mating structures 94, 96 of the rupture indicator 14 may be male and/or female, and the mating structures 82, 84 of the holder 40 may be male and/or female.

Figure 4:
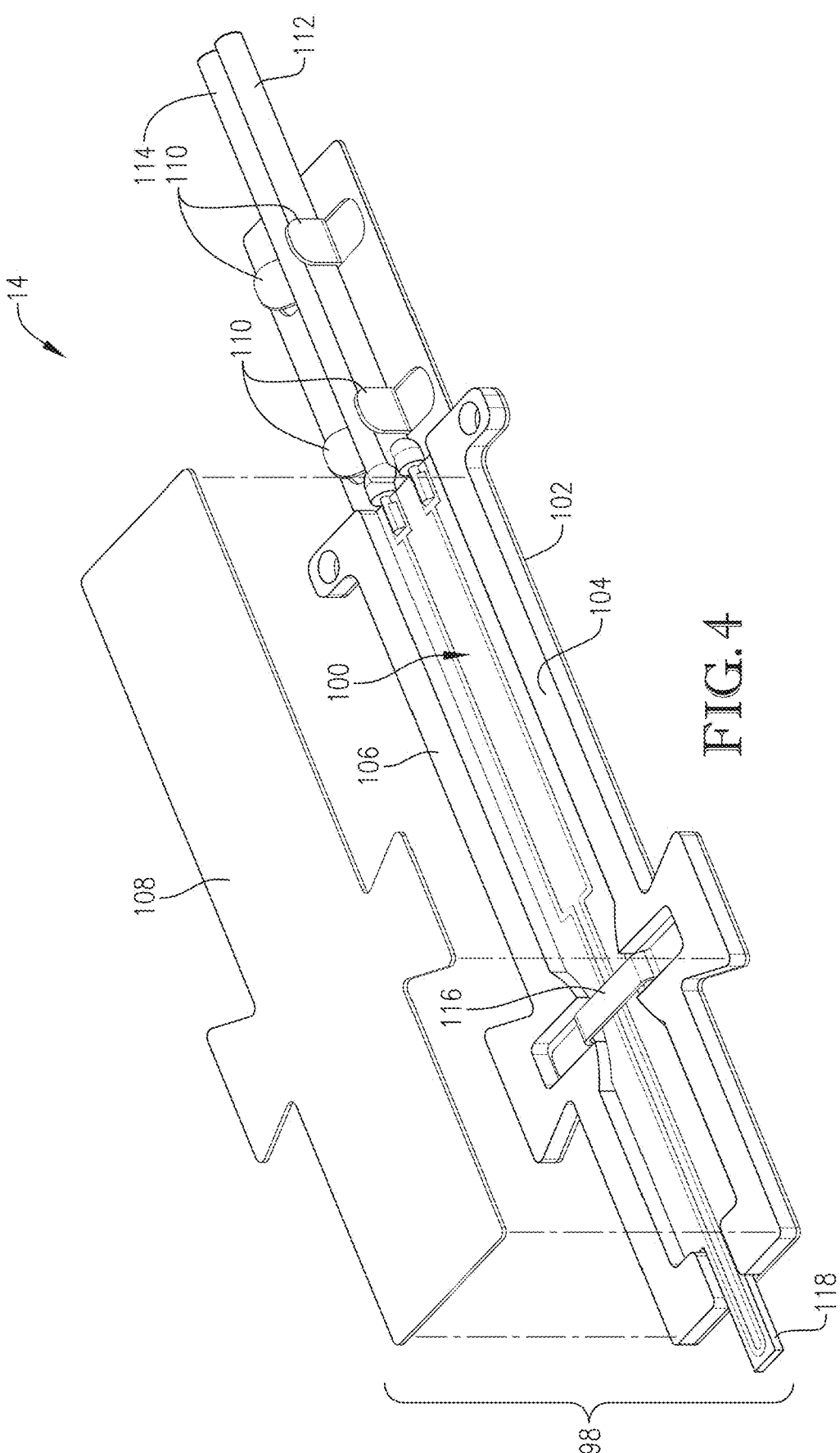
FIG. 4 is a perspective view of the rupture indicator of FIG. 3 with a top cover thereof removed, illustrating an electrically conductive trace of the rupture indicator.
Figure 5:
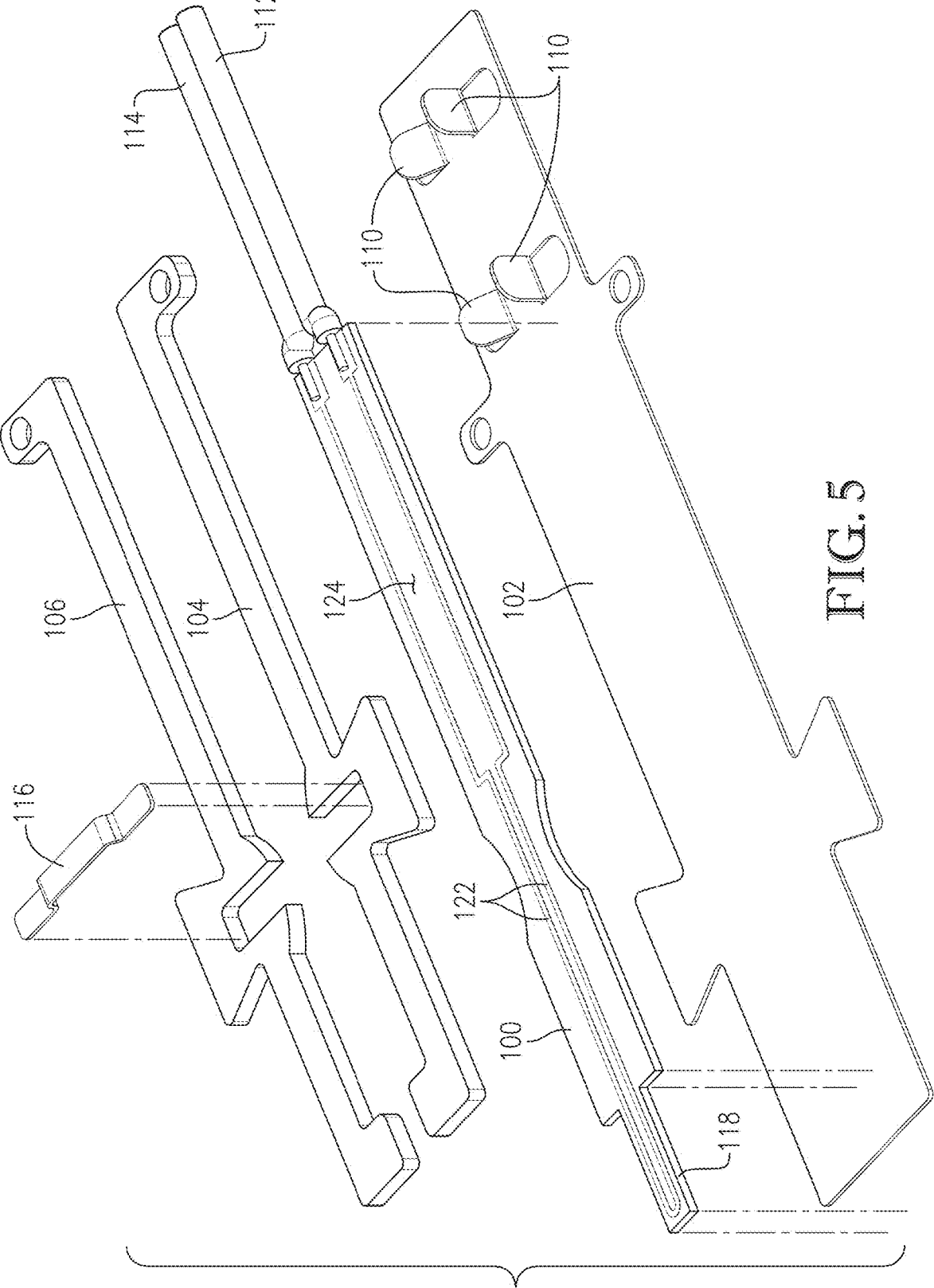
FIG. 5 is an exploded view of selected components of the rupture indicator of FIG. 3.

Turning to FIGS. 4 and 5, the rupture indicator 14 comprises a substrate 100 and an electrically conductive trace 122 located on said substrate 100. In one or more embodiments the rupture indicator 14 includes an enclosure assembly 98 encasing at least a portion of the substrate 100. The enclosure assembly 98 comprises a bottom cover 102, one or more spacers 104, 106, and a top cover 108. The bottom cover 102 supports the substrate 100 and includes one or more bendable tabs 110 operable to engage one or more wires 112, 114. The bottom cover 102 may be made of metal, such as stainless steel or the like. The spacers 104, 106 are positioned on the bottom cover 102 and border at least a portion of the substrate 100. In one or more embodiments, the enclosure assembly 98 includes a substrate clip 116 that holds the substrate 100 against the bottom cover 102. The clip 116 may comprise electrically nonconductive material and may be adhered to the bottom cover 102 over the substrate 100. The top cover 108 overlays the spacers 104, 106 to encase portions of the substrate 100. Similar to the bottom cover 102, the top cover 108 may be made of metal, such as stainless steel or the like.

The substrate 100 is operatively associated with the outer flange section 18 via the enclosure assembly 98 and the holder 40 and includes a tab 118. Turning to FIG. 7, the tab 118 is cantilevered and extends over and in spaced relation to the surface 24 of the central section 16 when the device 10 is installed within a structure 11 to be protected from an overpressure condition. The structure 11 may be a pipe system, a ventilation conduit, one or more walls or roofs of a facility or chamber, or the like. The overpressure condition may be related to a predetermined threshold, which may be a pressure at which the relief member 12 is configured to rupture.

Figure 8:
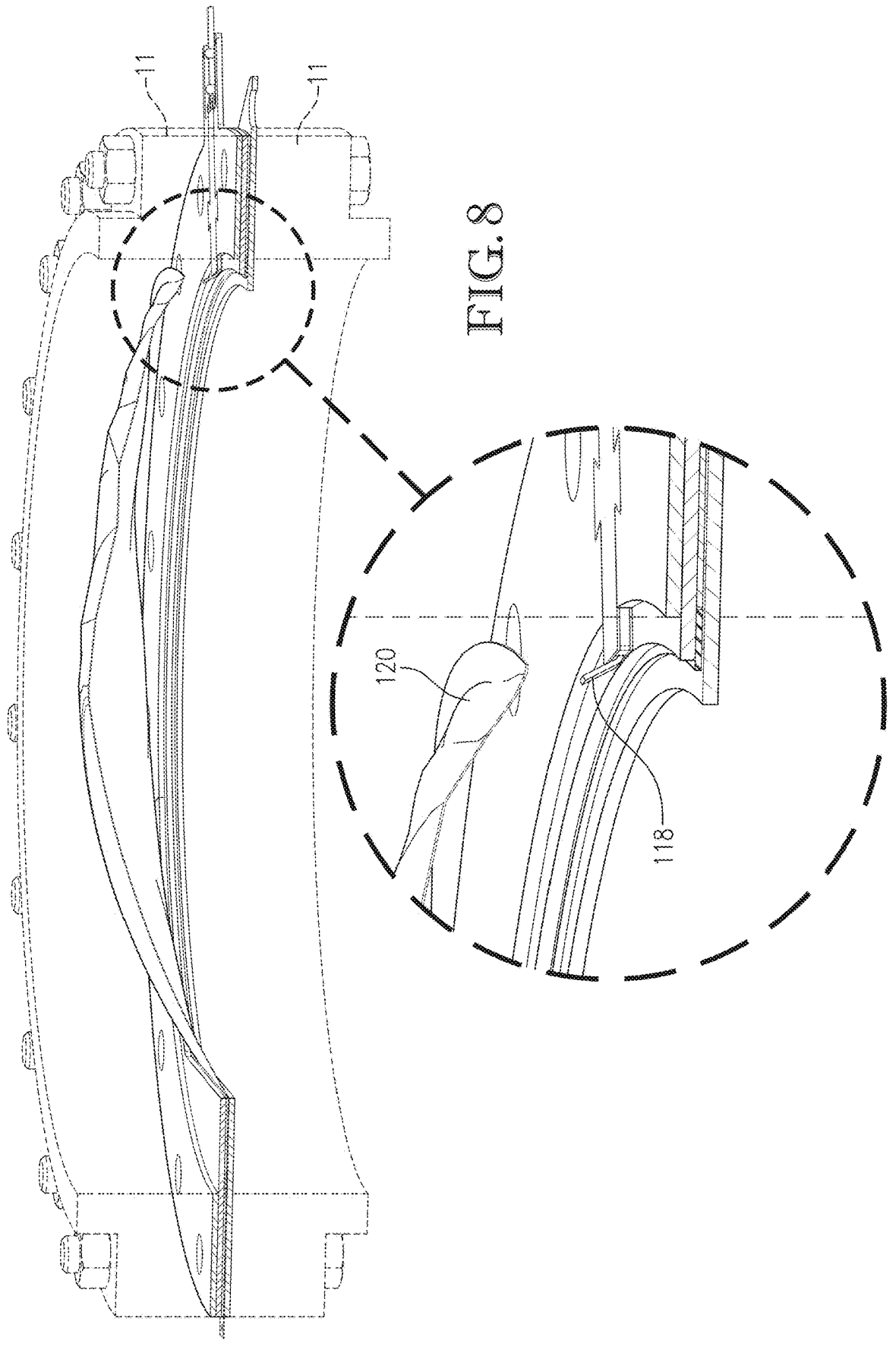
FIG. 8 is a close up, sectional view of the device of FIG. 1 operatively associated with pipe components, illustrating the device in a ruptured operating condition.

In one or more embodiments, the tab 118 extends radially inward from the flange section 18 in a direction toward a central axis of the central rupturable section 16. The tab 118 extends over the line of opening 44. In one or more embodiments, the tab 118 extends inwardly of said line of opening about 3 millimeters (mm) to about 6 mm, and in preferred embodiments, about 4 mm to about 5 mm. In one or more embodiment, the substrate 100 is made of a frangible material, such as ceramic or glass so that when the central section 16 ruptures to form the petal 120, the rupturing action of the petal breaks the tab 118 away from the rest of the substrate 100, as depicted in FIG. 8.

Turning back to FIG. 5, the electrically conductive trace 122 is located on the substrate 100 and extends onto at least a portion of the tab 118. The trace 122 defines an electrical circuit capable of conducting an electrical signal and operable to be used to detect a process condition associated with the over-pressure relief device 10. The wires 112, 114 are electrically connected to the trace 122 via solder pads. However, the wires 112, 114 may be connected to the trace 122 any number of ways without departing from the scope of the present invention. In one or more embodiments, the trace 122 is disposed on an upper surface 124 of the substrate 100. The trace 122 may be made of any transition metal such as silver, gold, copper, aluminum, iron, titanium, platinum, or tungsten. In addition to these materials, the trace 122 may also comprise conductive non-metals such as carbon particles, or semi-conductive metalloids such as silicon or doped silicon. The trace 122 may also include conductive polymeric inks.

In one or more embodiments, a nonconductive coating is applied to at least a portion of a face of the substrate 100. For example, the nonconductive coating may be applied to the trace 122. In certain embodiments, the nonconductive coating is applied as a liquid or paste and cured in situ without there being an intermediate adhesive composition. The nonconductive coating may comprise a nonconductive paint, primer or ink. In certain embodiments, the coating may comprise a nonconductive etching primer. In other embodiments, nonconductive the coating comprises a UV-curable material that is applied and cured in place through exposure to UV radiation. The nonconductive coating may be formulated to maximize adhesion to the surface of the substrate 100 and/or the trace 122. Exemplary nonconductive coatings may comprise nonconductive metal oxides (such as titanium dioxide compounds), nonconductive polymers, ceramics, epoxy-based components, silicone elastomers, or PARYLENE (poly(para-xylylene) polymer). In certain embodiments, the nonconductive coating is applied using inkjet printing techniques, although other types of printing technologies can be used such as screen printing, lithography, and the like. Because the substrate 100 and the trace 122 are spaced apart from the heated surface 24 of the central section 16, and because they are preferably made of materials with high melting temperatures, the rupture indicator 14 is operable to withstand extremely high temperatures. As used herein, "withstand" means the trace 122 retains certain conductive properties at the required maximum operating temperature. Particularly, the rupture indicator 14 is operable at temperatures of at least 400° C. to 700° C. In one or more embodiments, the rupture indicator 14 is operable at temperatures of at least 500° C. and up to 700° C. In preferred embodiments, the rupture indicator 14 is operable at temperatures at least above 600° C. up to 700° C.

Figure 9:
FIG. 9 is a close up, sectional view of a pressure relief device having a rupture indicator according to another embodiment of the present invention.

A rupture indicator 14A constructed in accordance with another embodiment of the invention is shown in FIG. 9. The rupture indicator 14A may comprise substantially similar components as rupture indicator 14; thus, the components of rupture indicator 14A that correspond to similar components in rupture indicator 14 have an 'A' appended to their reference numerals.

The rupture indicator 14A is similarly operable to be placed within the slot 60 of the member 12 so that the exterior surface 90A of the rupture indicator 14A is flush with the top surface 92 of the rupture indicator holder 40. Rupture indicator 14A likewise includes mating structures 94A, 96A for mating with the holder 40.

Figure 10:
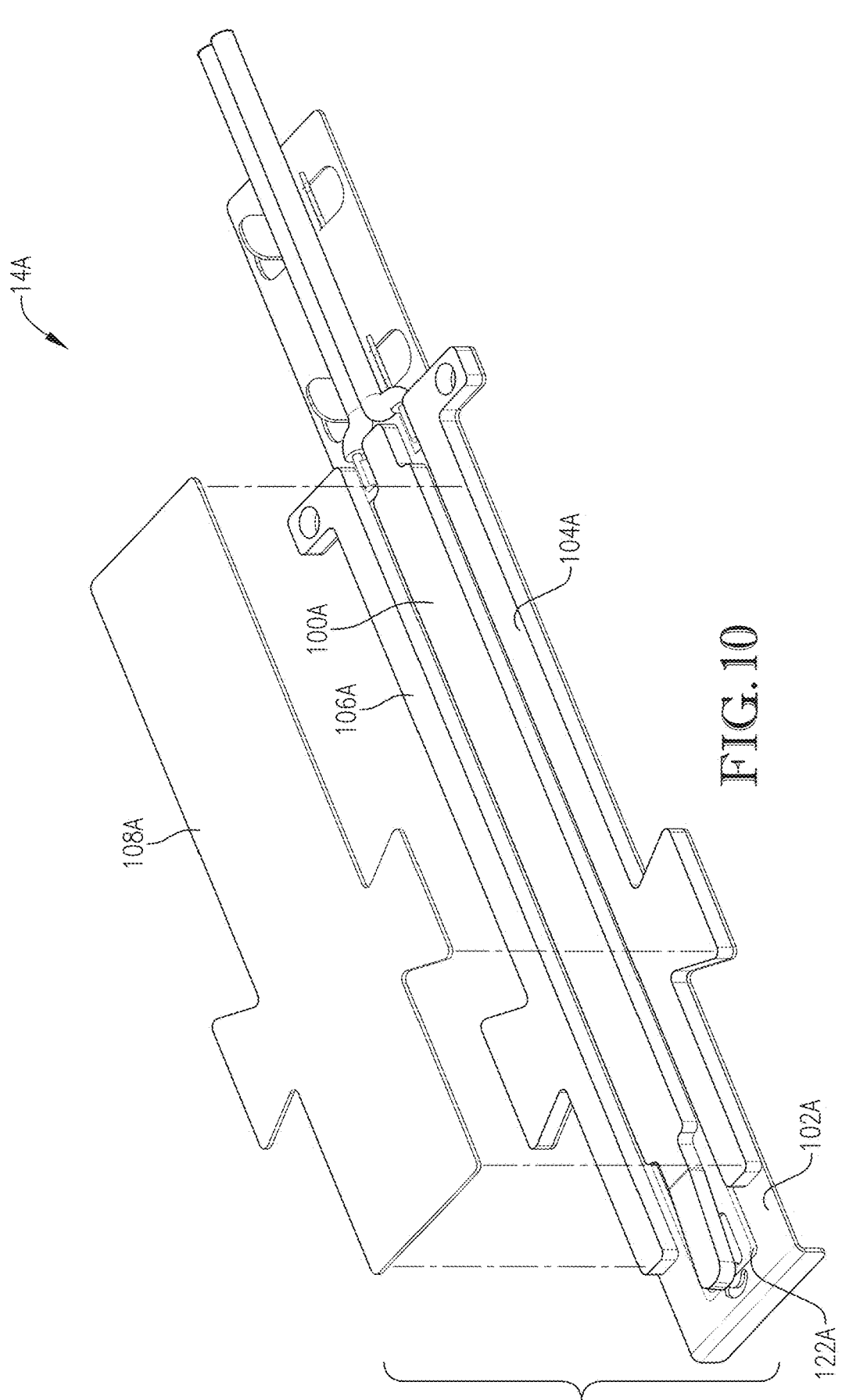
FIG. 10 is a perspective view of the rupture indicator of FIG. 9 with a top cover thereof removed, illustrating a rigid member of the rupture indicator.

Turning to FIG. 10, the rupture indicator 14A comprises a pliable substrate 102A with the trace 122A disposed on the substrate 102A and a rigid member 100A positioned on the substrate 102A for contacting the trace 122A when the action of the petal 120 bends the substrate 102A. In one or more embodiments, the rupture indicator 14A also includes an enclosure assembly comprising spacers 104A, 106A and a top cover 108A that cooperatively encasing at least a portion of the trace 122A and/or rigid member 100A.

Figure 11:
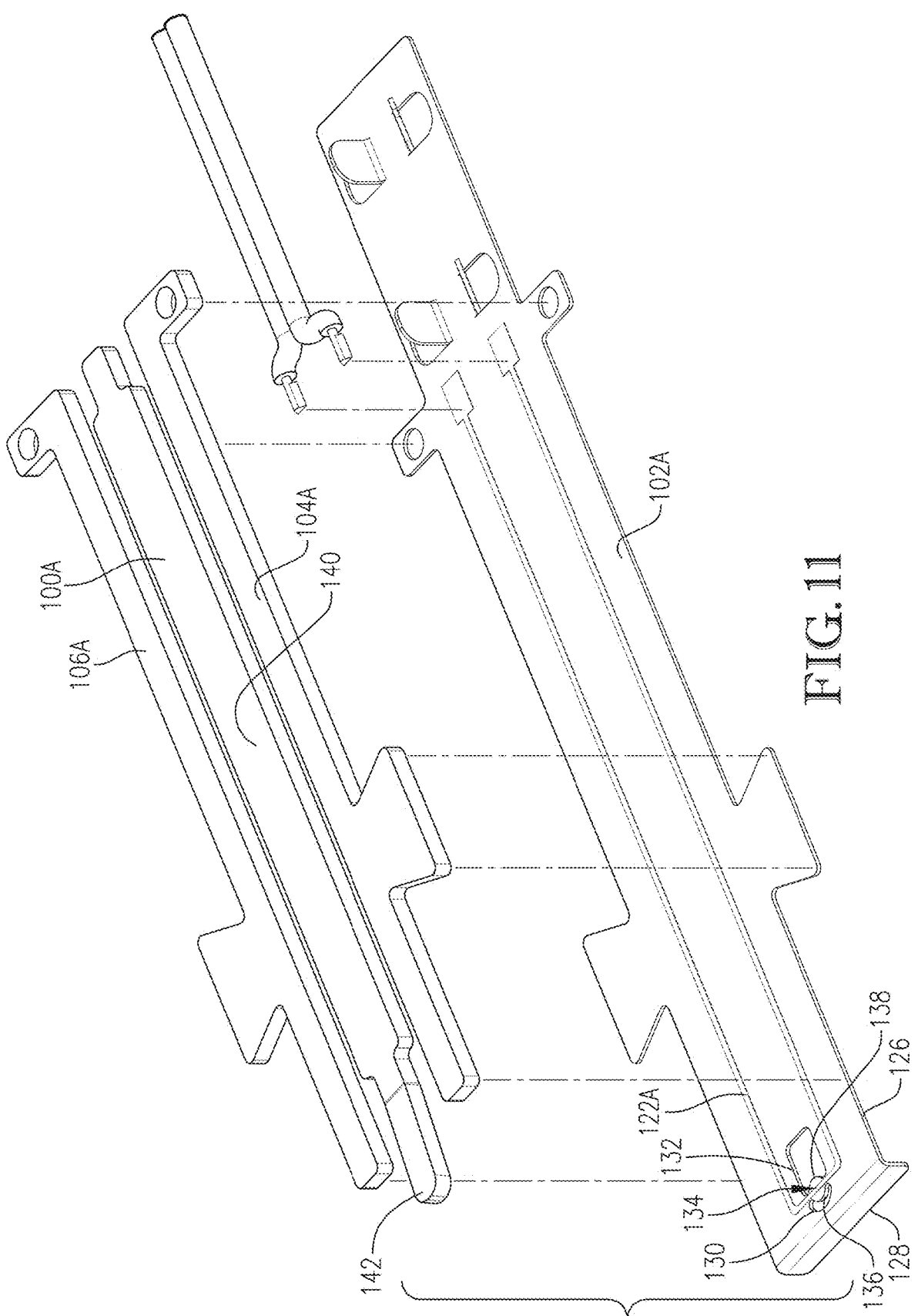
FIG. 11 is an exploded perspective view of selected components of the rupture indicator of FIG. 9.
Figure 12:
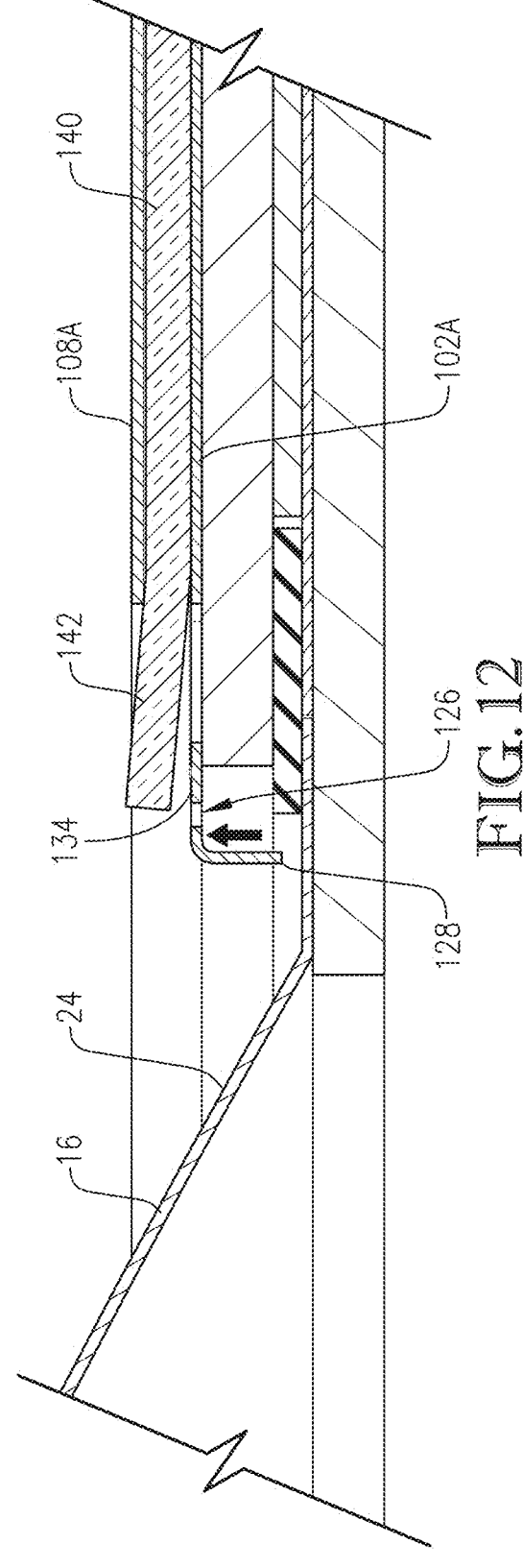
FIG. 12 is a sectional view of the pressure relief device of FIG. 9, illustrating the relative positioning of a tongue of the rigid member and a cantilevered end of a substrate of the rupture indicator.
Figures 13, 14:
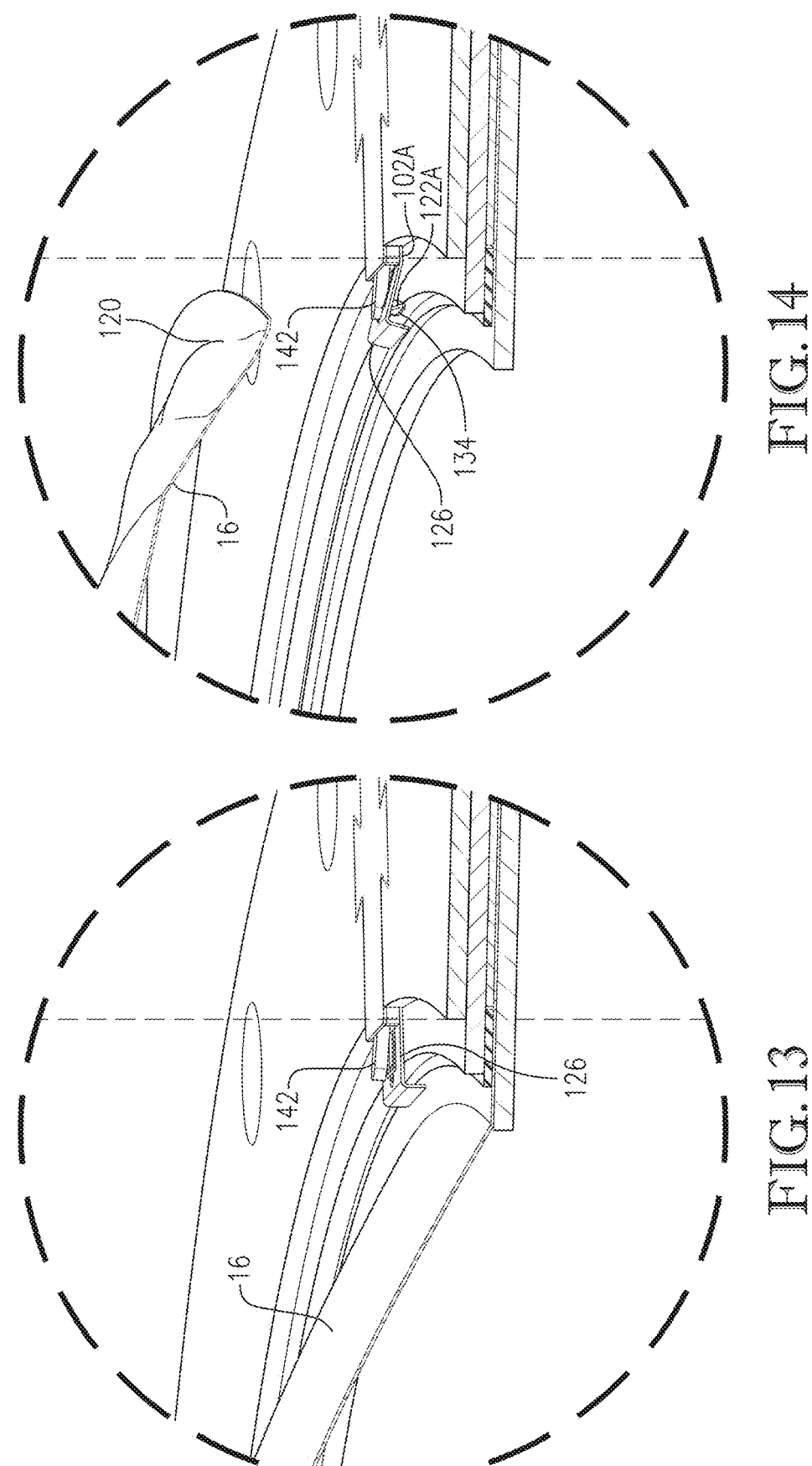
FIG. 13 is a close up view of the pressure relief device of FIG. 9, illustrating the device in a normal operating condition.
FIG. 14 is a close up view of the pressure relief device of FIG. 9, illustrating the device in a ruptured operating condition.

Turning to FIG. 11, the substrate 102A includes a cantilevered end 126 that extends over and is in spaced relation to the surface 24 of the central section 16 (as depicted in FIGS. 12-14). In one or more embodiments, the cantilevered end 126 includes a lip 128 extending downwardly toward the surface 24 of the central rupturable section 16 (as best depicted in FIG. 12). The lip 128 helps ensure that the cantilevered end 126 is contacted by the petal 120 (depicted in FIG. 14) and bent upwards (as indicated by the arrow in FIG. 12) to ensure the rigid member 100A contacts the trace 122A. In one or more embodiments, the lip 128 extends orthogonally relative to the rest of the substrate 102A.

In one or more embodiments, the cantilevered end 126 includes one or more weakened areas, such as apertures 130, 132, operable to aid the rigid member 100A in affecting the trace 122A and/or to help ensure the cantilevered end 126 bends in a desired manner. While the weakened areas are depicted as apertures 130, 132, the weakened areas may be thinned regions, recesses, slits, or the like without departing from the scope of the present invention. The apertures 130, 132 may be sized to receive at least a portion of the rigid member 100A. Particularly, the apertures 130, 132 may have widths that correspond to the portion of the rigid member 100A that is operable to contact the cantilevered end 126 so that in some embodiments, that portion of the rigid member 100A extends through the apertures 130, 132 when the cantilevered end 126 is bent.

In one or more embodiments, the apertures 130, 132 may be located on opposite sides of a length of the trace 122A to define a bridge 134. The bridge 134 may include one or more laterally extending portions 136, 138 operable to be contacted by the portion of the rigid member 100A when the petal 120 bends the cantilevered end 126. The rigid member 100A engages the laterally extending portions 136, 138 to cause the bridge 134 to rotate relative to a remainder of the cantilevered end 126, thereby causing at least a portion of the trace 122A and/or the bridge 134 to be sheared from the rest of the cantilevered end 126.

In one or more embodiments, the substrate 102A comprises a metal, such as copper, aluminum, stainless steel, or the like. The substrate 102A may also include an electrically nonconductive film upon which the trace 122A is disposed. The nonconductive coating may be any of the nonconductive coatings described above and may be applied to at least a portion of at least one face of the substrate 102A and/or trace 122A.

The electrically conductive trace 122A is located on the substrate 102A and extends onto at least a portion of the cantilevered end 126. In one or more embodiments, the trace 122A extends across the bridge 134 on the cantilevered end 126. The trace 122A may also extend along a path outside of the areas of the substrate 102A upon which the rigid member 100A and the spacers 104A, 106A will be supported on the substrate 102A.

The rigid member 100A is operatively associated with the substrate 102A and extends over the trace 122A on the cantilevered end 126 so that when the central section 16 ruptures forming the petal 120, the petal 120 contacts and bends the cantilevered end 126 so that the rigid member 100A contacts the trace 122A, thereby affecting the circuit defined by the trace 122A. Affecting the circuit may include any number of effects without departing from the scope of the present invention. For example, it may affect the electrical continuity, resistance, capacitance, inductance, or reflectance of the circuit. The rigid member 100A comprises a body portion 140 and a tongue 142 that extends from the body portion 140 over a portion of the trace 122A. In one or more embodiments, the body portion 140 is positioned on the substrate 102A and the tongue 142 extends over a portion of the trace 122A so that the tongue 142 is in a spaced relationship with the portion of the trace 122A. This prevents the tongue 142 from rubbing on the portion of the trace 122A when installed in systems subject to vibration, which could cause the trace 122A to be worn off, thereby forming an open circuit and triggering a false alarm.

Turning to FIG. 12, in one or more embodiments, the tongue 142 extends from the body portion 140 at an angle relative to the cantilevered end 126 (when in the normal operating position) so that the tongue 142 is above the bridge 134 and the portion of the trace 122A on the bridge 134. This makes it so that the tongue 142 only contacts the trace 122A when the cantilevered end 126 is forced upwards in the direction indicated by the arrow by the petal 120. As depicted in FIG. 13, in the normal operation condition, the cantilevered end 126 extends over the central rupturable section 16 with the tongue 142 positioned above a portion of the cantilevered end 126. As depicted in FIG. 14, when the central section 16 ruptures and the petal 120 is formed, the petal 120 forces the cantilevered end 126 to bend upwards relative to the rest of the substrate 102A causing the tongue 142 to contact the bridge 134 and sever a portion of the bridge 134 and/or the trace 122A on the bridge 134. This results in an open circuit, which is detectable by appropriate signal detection equipment.

Figure 15:
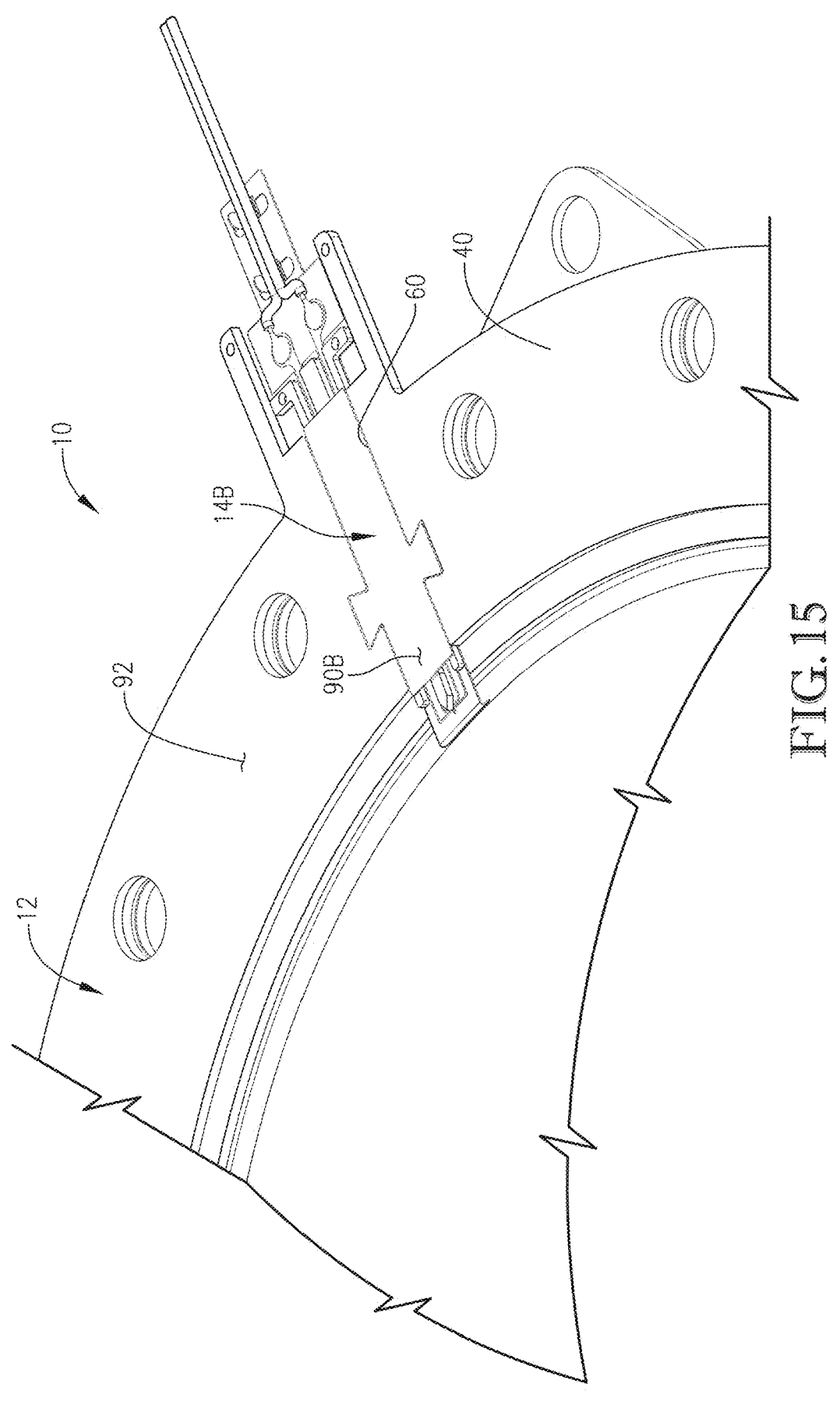
FIG. 15 is perspective view of a pressure relief device and rupture indicator in accordance with another embodiment of the present invention.

A rupture indicator 14B constructed in accordance with another embodiment of the invention is shown in FIG. 15. The rupture indicator 14B may comprise substantially similar components as rupture indicator 14A; thus, the components of rupture indicator 14B that correspond to similar components in rupture indicator 14A have a 'B' appended to their reference numerals.

Figure 16:
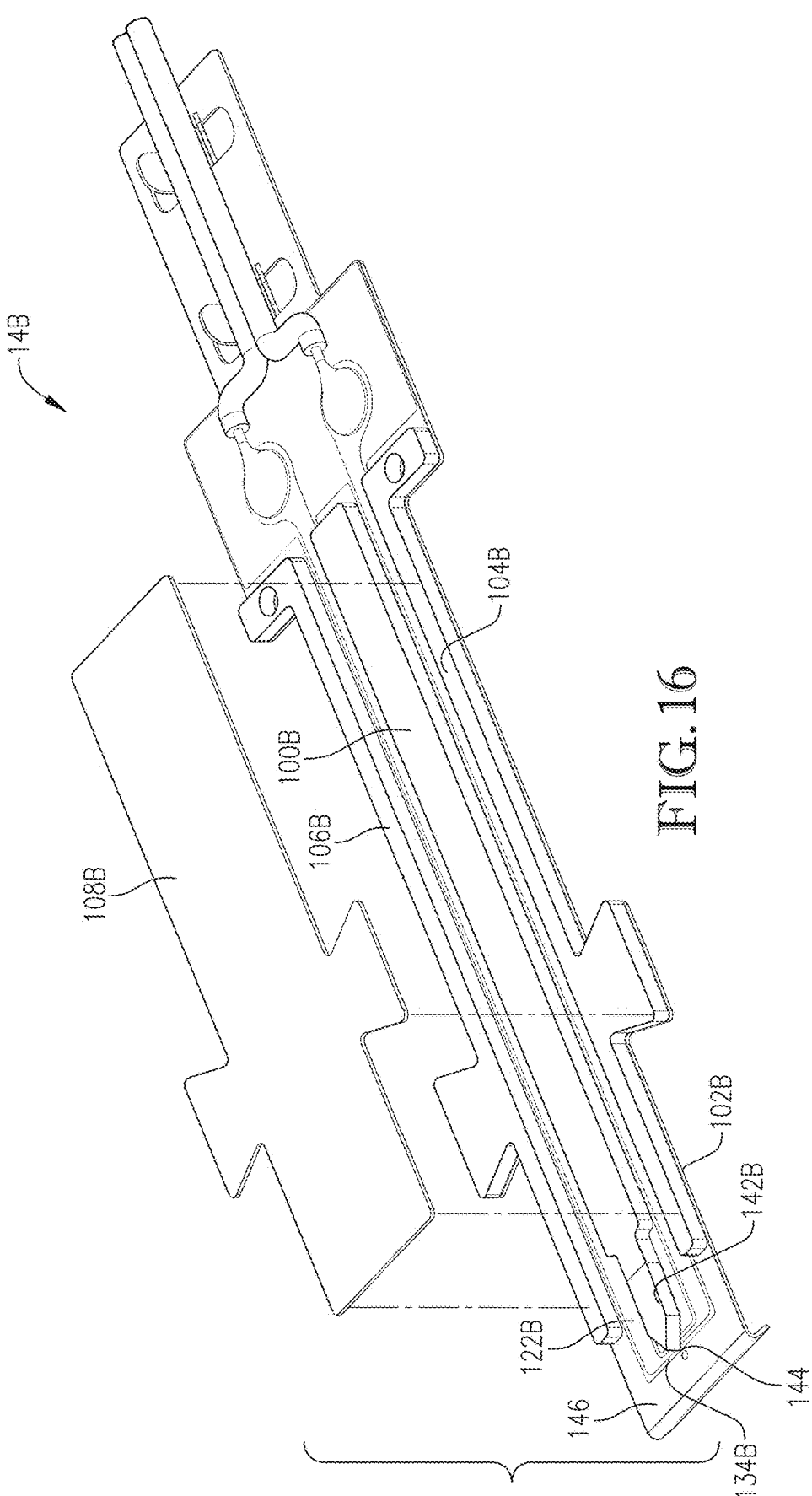
FIG. 16 is a perspective view of the rupture indicator of FIG. 15 with a top cover thereof removed, illustrating an electrically conductive trace of the rupture indicator.

The rupture indicator 14B is similarly operable to be placed within the slot 60 of the member 12 so that the exterior surface 90B of the rupture indicator 14B is flush with the top surface 92 of the rupture indicator holder 40. Turning to FIG. 16, the rupture indicator 14B is substantially similar to rupture indicator 14A except that the bottom cover 102B has a single aperture 130B (depicted in FIG. 17), the tongue 142B includes a pointed end 144, and the rupture indicator 14B further comprises a frangible substrate 146 overlaying the bottom cover 102B. FIG. 16 depicts the top cover 108B removed from the rest of the rupture indicator 14B. The rigid member 100B and spacers 104B, 106B overlay the substrate 146. The rigid member 100B is arranged so that the pointed end 144 of the tongue 142B is spaced apart from and extending over a portion 134B of the trace 122B. The pointed end 144 is depicted as having a triangular prism shape; however, the pointed end 144 may have any number of shapes without departing from the scope of the present invention.

Figure 17:
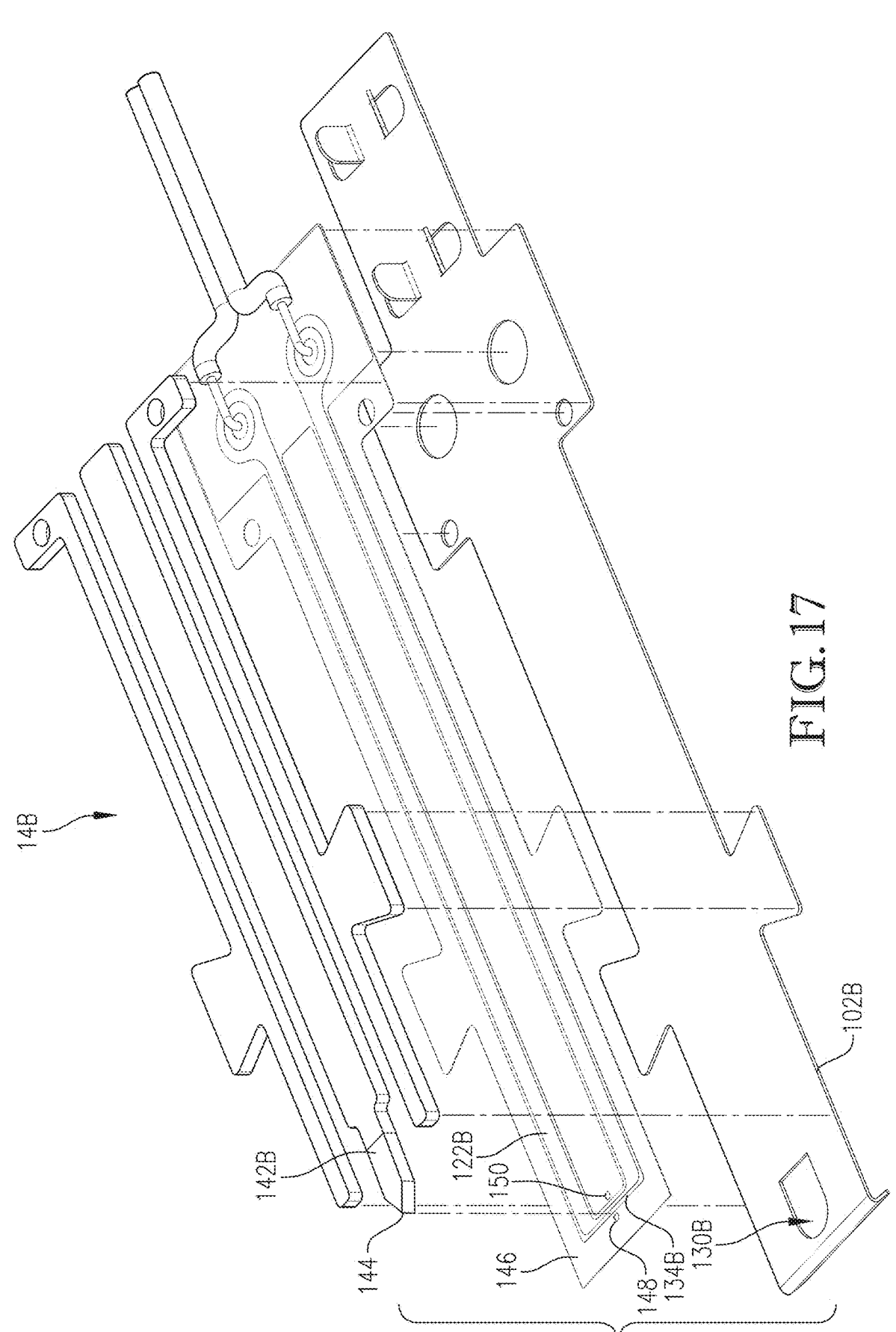
FIG. 17 is an exploded view of selected components of the rupture indicator of FIG. 15.

Turning to FIG. 17, the frangible substrate 146 is secured to the bottom cover 102B. The trace 122B is disposed on the substrate 146. The substrate 146 is arranged relative the bottom cover 102B so that the portion 134B of the trace 122B beneath the pointed end 144 goes over the aperture 130B of the bottom cover 102B. The pointed end 144 of the tongue 142B is operable to tear the portion 134B of the trace 122B as tongue 142B extends into the aperture 130B of the bottom cover 102B during a rupture event (depicted in FIG. 20). In one or more embodiments, the substrate 146 includes a pair of apertures 148, 150 on either side of the portion of the portion 134B of the trace 122B for aiding the pointed end 144 in tearing the substrate 146 and therefore the portion 134B of the trace 122B between the apertures 148, 150. This causes the trace 122B to form an open circuit, thereby triggering the alarm. While FIG. 17 depicts a pair of circular apertures 148, 150, the substrate 146 may include any number of apertures with any shape without departing from the scope of the present invention. In one or more embodiments, the substrate 146 does not include any apertures.

Figure 18:
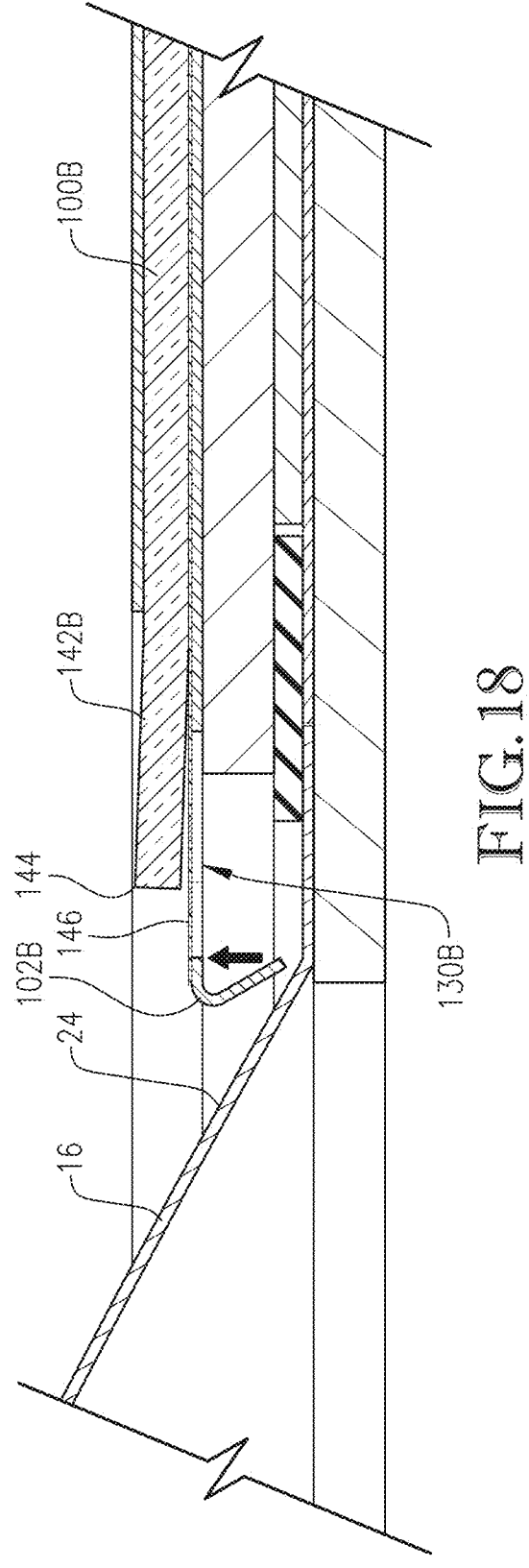
FIG. 18 is a is a sectional view of the pressure relief device of FIG. 15.
Figures 19, 20:
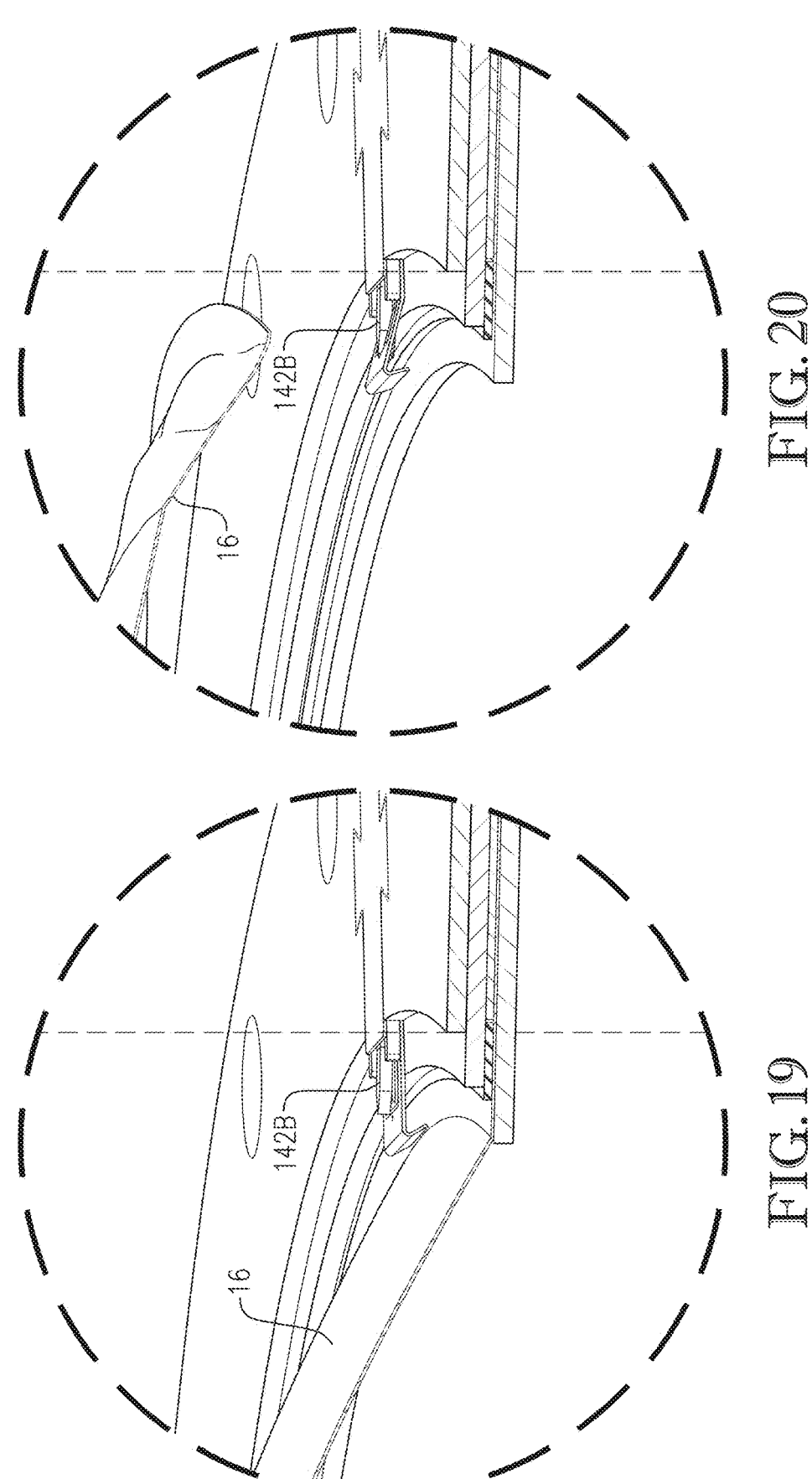
FIG. 19 is a close up view of the pressure relief device of FIG. 15, illustrating the device in a normal operating condition.
FIG. 20 is a close up view of the pressure relief device of FIG. 15, illustrating the device in a ruptured operating condition.

Turning to FIG. 18, the tongue 142B of the rigid member 100B is similarly angled relative to the rest of the rigid member 100B so that it is in a spaced relationship with the portion 134B of the trace 122B beneath it during normal operating conditions (depicted in FIG. 19). During a rupture event, the bottom cover 102B bends upwards (depicted by the arrow) so that the substrate 146 strikes the pointed end 144 of the tongue 142B. When the substrate 146 strikes the pointed end 144, the substrate 146 and/or the portion 134B of the trace 122B are altered to indicate the rupture event. In some embodiments, when the substrate 146 strikes the pointed end 144, the pointed end 144 of the tongue 142B pierces the substrate 146 and/or the trace 122B and extends into the aperture 130B of the bottom cover 102B (as depicted in FIG. 20).

Figure 21:
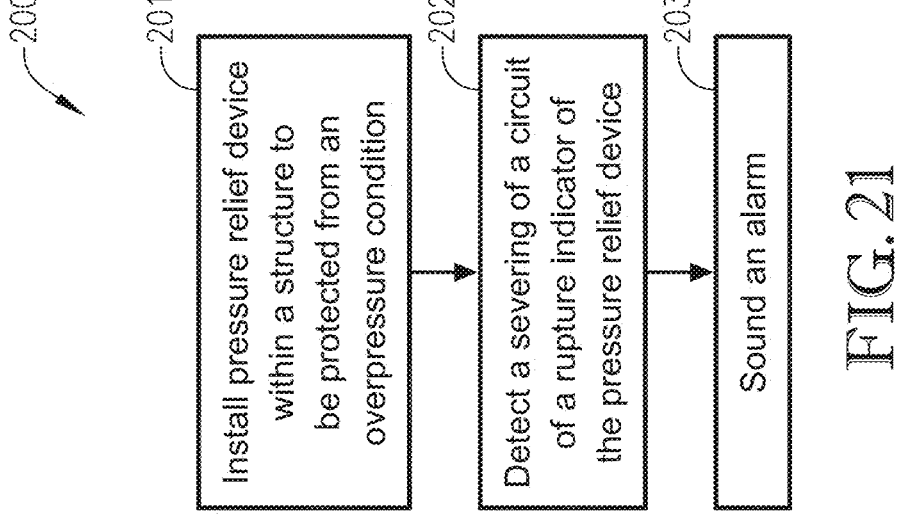
FIG. 21 is a flowchart depicting exemplary steps of a method according to an embodiment of the present invention.

The flow chart of FIG. 21 depicts the steps of an exemplary method 200 of detecting opening of a pressure relief device. In some alternative implementations, the functions noted in the various blocks may occur out of the order depicted in FIG. 15. For example, two blocks shown in succession in FIG. 21 may in fact be executed substantially concurrently, or the blocks may sometimes be executed in the reverse order depending upon the functionality involved. In addition, some steps may be optional.

The method 200 is described below, for ease of reference, as being executed by exemplary devices and components introduced with the embodiments illustrated in FIGS. 1-20. Some of the steps of the method 200 may be performed through the utilization of signal detection equipment of one or more control panels having electrical circuitry, processors, transceivers, hardware, software, firmware, or combinations thereof. However, some of such actions may be distributed differently among such devices or other devices without departing from the spirit of the present invention.

Referring to step 201, the pressure relief device is installed within a structure to be protected from an overpressure condition. The structure may be a pipe system, a ventilation conduit, one or more walls or roofs of a facility or chamber, or the like. In one or more embodiments, the structure to be protected involves exposure to extremely high temperatures, such as temperatures of at least 400° C. to 700° C., temperatures of at least 500° C. and up to 700° C., or temperatures at least above 600° C. up to 700° C. The pressure relief device may include embodiments of the pressure relief device 10 discussed above having one or more rupture indicators, such as the rupture indicators 14, 14A, 14B. The pressure relief device may be installed so that the cantilevered tab 118 or cantilevered end 126 are on the side of the device from which the petal is propelled outward during an overpressure condition.

Referring to step 202, a severing of the circuit trace of the rupture indicator of the pressure relief device is detected. The severing of the circuit may be caused by the petal formed from the rupture breaking the tab 118 of the substrate 100 or the petal bending the cantilevered end 126 of the substrate 102A (or bottom cover 102B) so that the rigid member 100A, 100B tears the bridge 134 (or portion 134B of the trace 122B on the substrate 146). The severing of the circuit may be detected any number of ways without departing from the scope of the present invention. For example, appropriate signal detection equipment electrically connected to the wires (which are in turn electrically connected to the trace of the rupture indicator) may be used to check the continuity, electrical resistance, capacitance, inductance, reflectance, or another electrical characteristic of the trace.

Referring to step 203, an alarm is sounded. The alarm may be triggered by the signal detection equipment.

The method 200 may include additional, less, or alternate steps and/or device(s), including those discussed elsewhere herein.

We claim:

1. A rupture indicator for detecting a process condition associated with an over-pressure relief device having a central rupturable section and an outer flange section in surrounding relationship to said central section, the rupture indicator comprising:

an electrically nonconductive substrate configured to be operatively associated with the outer flange section and including a cantilevered tab that is configured to extend from said substrate over and in spaced relation to a surface of the central section;

an electrically conductive trace located on said substrate and extending onto at least a portion of said cantilevered tab, said trace defining an electrical circuit capable of conducting an electrical signal, said circuit being operable to detect the process condition associated with the over-pressure relief device, and wherein said substrate comprises at least one of ceramic or glass, and wherein said trace comprises silver.

2. An over-pressure relief device comprising:

a pressure relief member comprising a central rupturable section and an outer flange section in surrounding relationship to said central section; and the rupture indicator of claim 1.

3. The over-pressure relief device according to claim 2, wherein said substrate comprises at least one of ceramic or glass, and wherein said rupture indicator further comprises an enclosure assembly encasing at least a portion of the substrate, the enclosure assembly and having an outer surface that is flush with a surface of said outer flange section.

4. The over-pressure relief device according to claim 3, wherein said outer flange section comprises a rupture indicator holder configured to overlie said pressure relief member and comprising a slot configured to receive said rupture indicator.

5. The over-pressure relief device according to claim 3, wherein said enclosure assembly comprises:

a bottom cover supporting said substrate and including one or more bendable tabs operable to engage one or more wires;

one or more spacers positioned on said bottom cover and bordering at least a portion of said substrate; and a top cover that overlays said one or more spacers.

6. The over-pressure relief device according to claim 2, wherein said cantilevered tab of said substrate extends radially inward from said flange section in a direction toward a central axis of said central rupturable section, wherein said central rupturable section includes a line of opening formed thereon, and said cantilevered tab includes a portion that extends over said line of opening.

7. A rupture indicator for detecting a process condition associated with an over-pressure relief device having a central rupturable section and an outer flange section in surrounding relationship to said central section, the rupture indicator comprising:

an electrically nonconductive substrate configured to be operatively associated with the outer flange section and including a cantilevered tab that is configured to extend from said substrate over and in spaced relation to a surface of the central section;

an electrically conductive trace located on said substrate and extending onto at least a portion of said cantilevered tab, said trace defining an electrical circuit capable of conducting an electrical signal, said circuit being operable to detect the process condition associated with the over-pressure relief device;

a bottom cover supporting said substrate and including one or more bendable tabs operable to engage one or more wires;

one or more spacers positioned on said bottom cover and bordering at least a portion of said substrate; and a top cover that overlays said one or more spacers.

8. An over-pressure relief device comprising:

a pressure relief member comprising a central rupturable section and an outer flange section in surrounding relationship to said central section; and the rupture indicator of claim 7.

9. A rupture indicator for detecting a process condition associated with an over-pressure relief device having a central rupturable section and an outer flange section in surrounding relationship to said central section, the rupture indicator comprising:

an electrically nonconductive substrate configured to be operatively associated with the outer flange section and including a cantilevered tab that is configured to extend from said substrate over and in spaced relation to a surface of the central section; and an electrically conductive trace located on said substrate and extending onto at least a portion of said cantilevered tab, said trace defining an electrical circuit capable of conducting an electrical signal, said circuit being operable to detect the process condition associated with the over-pressure relief device, wherein said cantilevered tab includes a first surface configured to face the central section and a second surface opposing said first surface, and said trace is disposed on said second surface.

10. An over-pressure relief device comprising:

a pressure relief member comprising a central rupturable section and an outer flange section in surrounding relationship to said central section; and the rupture indicator of claim 9.

11. A rupture indicator for detecting a process condition associated with an over-pressure relief device having a central rupturable section and an outer flange section in surrounding relationship to said central section, the rupture indicator comprising:

a pliable substrate configured to be operatively associated with the outer flange section and including a cantilevered end that is configured to extend over in spaced relation to a surface of the central section;

an electrically conductive trace located on said substrate and extending onto at least a portion of said cantilevered end, said trace defining an electrical circuit capable of conducting an electrical signal; and a rigid member operatively associated with said substrate and extending over said trace on said at least a portion of said cantilevered end so that when the central section ruptures forming a petal, the petal contacts and deforms said cantilevered end so that said rigid member contacts said trace, thereby affecting said circuit.

12. The rupture indicator according to claim 11, wherein said substrate comprises stainless steel.

13. The rupture indicator according to claim 12, wherein said substrate comprises a film made of electrically nonconductive material disposed thereon, and said trace comprises silver disposed on said electrically nonconductive material.

14. The rupture indicator according to claim 11, further comprising:

one or more spacers positioned on said substrate and bordering at least a portion of said rigid member; and a top cover that overlays said one or more spacers.

15. The rupture indicator according to claim 11, wherein:

said rigid member comprises a body portion positioned on said substrate, and a tongue that extends from said body portion at an angle relative to said substrate so that said tongue is above said trace and in a spaced relationship with said trace, said cantilevered end comprises:

a first aperture sized to receive said tongue and located on a first side of said trace; and a second aperture sized to receive said tongue and located on a second side of said trace opposite to the first side to define a bridge positioned beneath said tongue and supporting a length of said trace.

16. The rupture indicator according to claim 15, wherein said bridge includes a laterally extending portion operable to be contacted by said portion of said rigid member when the petal deforms said cantilevered end so that the contact between the laterally extending portion and said portion of said rigid member causes said bridge to rotate relative to a remainder of said substrate.

17. An over-pressure relief device comprising:

a pressure relief member comprising a central rupturable section and an outer flange section in surrounding relationship to said central section; and the rupture indicator according to claim 11.

18. A rupture indicator for detecting a process condition associated with an over-pressure relief device having a central rupturable section and an outer flange section in surrounding relationship to said central section, the rupture indicator comprising:

a pliable bottom cover operatively associated with said outer flange section and including a cantilevered end operable to extend over and in spaced relation to a surface of said central section;

a frangible non-conductive substrate positioned on the bottom cover;

an electrically conductive trace located on said non-conductive substrate and including a portion that extends over at least a portion of said cantilevered end, said trace defining an electrical circuit capable of conducting an electrical signal; and a rigid member operatively associated with said substrate and having a pointed end extending over said portion of said trace so that when said central section ruptures forming a petal, the petal contacts and deforms said cantilevered end so that said pointed end contacts said trace, thereby affecting said circuit.

19. The rupture indicator according to claim 18, wherein said rigid member comprises a body portion positioned on said substrate, and a tongue that extends from said body portion over said trace so that said tongue is in a spaced relationship with said trace.

20. The rupture indicator according to claim 19, wherein said tongue extends from said body portion at an angle relative to said substrate.

21. The rupture indicator according to claim 18, wherein said bottom cover includes a cover weakened area operable to receive at least a portion of said rigid member when said cantilevered end is deformed.

22. The rupture indicator according to claim 21, wherein said substrate includes one or more substrate weakened areas operable to aid said rigid member in affecting said circuit.

23. The rupture indicator according to claim 22, wherein said cover weakened area comprises an aperture extending through the bottom cover, and said one or more substrate weakened areas comprise one or more apertures extending through said substrate.

24. The rupture indicator according to claim 22, wherein said one or more substrate weakened areas comprise a first area located on a first side of said trace, and a second area located on a second side of said trace opposite to the first side.

25. An over-pressure relief device comprising:

a pressure relief member comprising a central rupturable section and an outer flange section in surrounding relationship to said central section; and the rupture indicator according to claim 22.

26. The rupture indicator according to claim 18, wherein said rupture indicator further comprises:

one or more spacers positioned on said substrate and bordering at least a portion of said rigid member; and a top cover that overlays said one or more spacers.

27. The rupture indicator according to claim 26, wherein said top cover comprises an outer surface that is operable to be flush with a top surface of the flange section.

28. The rupture indicator according to claim 18, wherein said trace comprises silver.

29. The rupture indicator according to claim 18, wherein said substrate and said trace are capable of withstanding temperatures of at least 400° C.

30. The rupture indicator according to claim 18, wherein said cantilevered end includes a lip extending downwardly toward a top surface of said central rupturable section.

31. The rupture indicator according to claim 18, wherein said bottom cover comprises stainless steel.

* * * * *